Feb. 8, 1927.

E. TYDEN 1,616,934

TANK GAUGE

Filed March 6, 1922

Inventor:
Emil Tyden,
by Burton & Burton
his Atty's

Patented Feb. 8, 1927.

1,616,934

UNITED STATES PATENT OFFICE.

EMIL TYDEN, OF EVANSTON, ILLINOIS.

TANK GAUGE.

Application filed March 6, 1922. Serial No. 541,298.

The purpose of this invention is to provide an improved form of gauge for a liquid containing tank or the like designed to eliminate the liability of inaccurate indication which commonly results from friction in the moving parts of existing devices. It consists of certain features and elements of construction and their combination hereinafter described and shown in the drawings as indicated by the claims.

Figure 1:
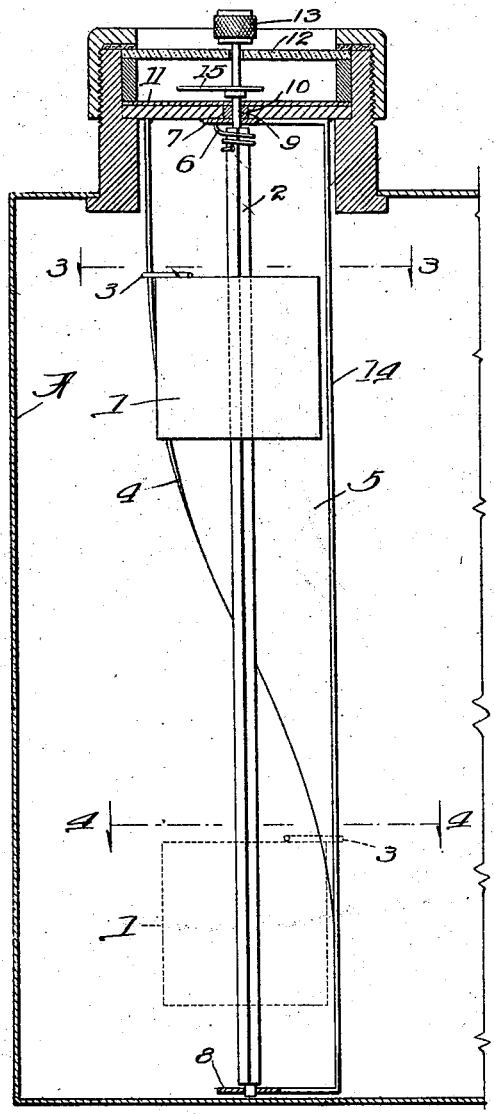
Figure 1 is a vertical sectional view of a portion of a liquid fuel tank such as that employed on an automobile together with a gauge embodying this invention installed in the tank.

In one common type of gauge employed for indicating the depth or quantity of liquid in a tank, a float is employed and is non-rotatively guided to rise and fall with the level of liquid while being operatively engaged with a screw or spiral member of slow pitch which is intended to be rotated by the float acting as a nut upon the screw or spiral and turning any suitable indicating member across a dial outside the tank. In such devices it is common experience to have the float stick upon the spiral member so that neither its buoyancy nor its weight is sufficient to dislodge it as the level of liquid rises or falls; thus the indicating member becomes inoperative and useless for its purpose. My invention will eliminate this difficulty by permitting the float member, 1, to rise and fall with perfect freedom when desired,—that is, not requiring any work of the float during its rise or fall but nevertheless employing the position which it assumes by reason of the level of liquid so as to furnish an exterior indication of that level. The float is slidably but non-rotatively engaged with a square shaft or spindle, 2, upon which it may rise and fall freely. A radially extending pin, 3, however, is normally held in contact with the helically formed edge, 4, of the vertically extending stop member, 5. This contact is maintained by a coiled spring, 6, anchored at one end in the bearing plate, 7, of the spindle, 2, and secured at the other end through a hole in the spindle as shown in Figure 1. The lower end of the spindle is rotatively journaled in a bearing, 8, adjacent the bottom of the tank, A, while the upper end is reduced and rounded at 9 to extend through a suitable packing washer, 10, past the dial plate, 11, and through the cover glass, 12. Its extreme outer end is furnished with a knob or handle, 13, by which the spindle, 2, may be rotated at will.

Whenever it is desired to learn the level of liquid in the tank, A, or the quantity remaining therein the knob, 13, is grasped and rotated in counter-clockwise direction so as to free the pin, 3, from the edge, 4, of the stop member, 5, and thus permit the float, 1, to rise or fall to the level of liquid in the tank. Obviously a very slight rotation of the knob, 13, will be sufficient to move the pin, 3, out of contact with the edge, 4, but if the tank has been refilled without resetting the float, 1, so that the latter is considerably submerged in the liquid, it will be necessary to rotate the float through a considerable angle to permit it to rise to the level of the liquid. Therefore for convenience the stop member, 5, is provided with a straight vertical edge, 14, which may serve as a stop for the counter-clockwise rotation of the spindle, 2; since the helical edge, 4, occupies less than half a turn from the bottom to the top of the tank the turning of the pin, 3, back as far as the stop edge, 14, will insure it a free path up or down in the liquid and entirely clear of the curved edge, 4. Thus upon giving the knob, 13, slightly more than half a turn to the left the float, 1, will immediately seek the level of the liquid and upon release of the knob, 13, the spring, 6, will turn the spindle, 2, back only so far as the helical stop, 4, will permit the pin, 3, to swing. The angular position of the pin, 3, corresponding to that particular level of liquid will then be indicated on the scale dial, 11, by the indicating needle, 15, carried by the upper end of the spindle, 2.

Figure 2:
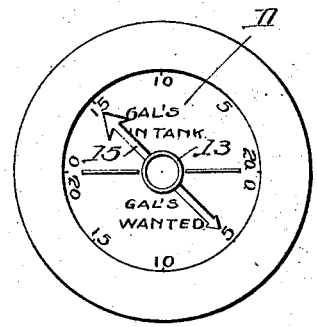
Figure 2 is a top plan view of the gauge showing the dial at which the reading appears.
Figure 3:
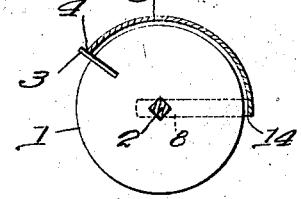
Figure 3 is a transverse detail section as indicated at line 3—3 on Figure 1.
Figure 4:
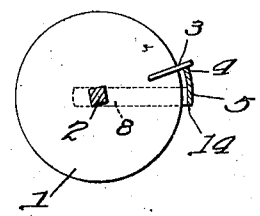
Figure 4 is a transverse detail section taken as indicated at line 4—4 on Figure 1, and assuming the float at the position shown in dotted lines in Figure 1.

For further convenience, I have shown in Figure 2 a dial carrying two scales each occupying 180° of the circle and have associated therewith a two-armed index needle, 15, with the arms diametrically opposed. One scale will thus indicate the actual quantity in the tank while the other scale indicates the quantity required to fill the tank. But whether such a scale dial be employed or not, it will be evident that my improved gauge practically eliminates the trouble heretofore experienced with vertically sliding floats while furnishing a practically instantaneous reading whenever the information is desired. Ordinarily on a road vehicle it is necessary to clean the gauge glass before the gauge can be read and in the same operation it is a simple matter to twist the knob, 13, for permitting the float to assume its proper position to provide a true reading of the quantity in the tank.

I claim:—

1. In combination with a liquid supply tank, a depth gauge device comprising a float and means by which it is guided for up-and-down movement in a pre-determined path; a moving element of an indicator controlled by the position of the float; a part carried by and having the up-and-down movement of the float due to the change of the depth of the liquid; two parts cooperating with said float-carried part for deriving from the up-and-down movement of the float a movement of one of said two cooperating parts transverse to that of the float-carried part, the other float-carried part having for such cooperation mutually engaging features encountering each other, the encountering feature of said other cooperating part being an edge thereof which extends up and down obliquely with respect to the up-and-down movement of the float; means for holding one of said two cooperating parts fixedly against movement transverse with respect to the up-and-down movement of the float, whereby such transverse movement of said two cooperating parts is necessary to permit or effect the up-and-down movement of the float; means yieldingly resisting the last mentioned transverse movement, and means extending outside the tank for causing such transverse movement of the float in opposition to said yielding resistance.

2. In combination with a liquid supply tank gauge device comprising a float with a guide encountering part and a guide for its up-and-down movement in the tank; a stop having an edge positioned for encounter of said part in the direct upward movement of the latter throughout a limited range of transverse rotative movement of the float with respect to said guide; whereby certain transverse rotative movement of the float is necessary to maintain its stop feature in contact with said edge; yielding means tending to cause such transverse rotative movement, and means extending for manual operation at will outside the tank for rotating the float contrariwise to said yielding means; the float being engaged with its guide for rotating movement therewith, and the guide member carrying outside the tank, the moving member of the indicating device.

3. In combination with a liquid supply tank, a gauge device comprising a vertically extended guide journaled to rotate about a vertical axis; a float non-rotatably engaged with the guide and slidable thereon in response to changes of liquid level in the tank; a rotatably extending stop arm on the float and a cooperating stop member of substantially spiral form extending adjacent the path of the float on the guide for encounter with said stop arm when the guide is rotated; a spring coiled upon the guide with one end anchored thereto, and the other end fixed with respect to the tank for yieldingly maintaining contact of the stop arm with the spiral stop member.

4. In combination with a liquid supply tank, a gauge device comprising a vertically extended guide journaled to rotate about a vertical axis; a float non-rotatably engaged with the guide and slidable thereon in response to changes of liquid level in the tank; a stop arm on the float and a cooperating stop member of substantially spiral form extending adjacent the path of the arm on the float for encounter with said stop arm when the guide is rotated; means outside the tank for turning the guide at will, together with indicating means outside the tank operable by rotation of the guide, and a spring coiled upon the guide with one end anchored thereto and the other end fixed with respect to the tank for yieldingly maintaining contact of the stop arm with the spiral stop member.

5. In a gasoline gauge, a cylindrical casing having a segment of its cylindrical wall removed, one edge of the remaining wall portion being in parallelism with the axis of the casing, the opposite edge being curved and constituting a stop; a float rotatably positioned within the casing and movable longitudinally thereof; means to rotate the float, and a stop element carried by the float, to contact with said curved edge, said curved edge extending spirally about the axis of rotation of the float; whereby such rotation to bring the stop element of the float into contact with the curved edge of the casing will correspond with the axial position of the float.

6. In a gasoline gauge, a float; a rotatable rod connected to rotate the float but along which the float is movable; supporting means for the rod including a zero stop portion adjacent the float and arranged in parallelism with the axis of the float, and a curved edge stop portion also adjacent the float, the curvature of the edge of said second portion being such as to provide a space between said portions of gradually increasing width towards one end of the path of axial movement of the float, and a pin carried by the float to contact with either of said portions, said curved edge extending spirally about the axis of rotation of the float, whereby such rotation from the zero position to bring the pin of the float into contact with the curved stop, will be proportional to the axial movement of the float from zero depth.

7. In a gasoline gauge, a float, a rotatable rod so connected with the float that the float, while adapted to move longitudinally of the rod, must rotate with it, supporting means for the rod, including a zero stop to control the rotation of the rod and float in one direction, and a curved edge stop adjacent the float, and a pin carried by the float to contact with said last-named stop, said curved edge extending spirally about the axis of rotation of the float, whereby such rotation from the zero position to bring the pin of the float into contact with the curved stop, will be proportional to the elevation of the float above zero depth position.

In testimony whereof, I have hereunto set my hand this 3rd day of March, 1922.

EMIL TYDEN.